United States Patent
Murofushi et al.

(10) Patent No.: US 7,486,131 B2
(45) Date of Patent: Feb. 3, 2009

(54) QUADRATURE DEMODULATOR AND INTERROGATOR

(75) Inventors: Nobuo Murofushi, Susono (JP); Sadatoshi Oishi, Fuji (JP)

(73) Assignee: Toshiba Tec Kabushiki Kaisha (JP)

( * ) Notice: Subject to any disclaimer, the term of this patent is extended or adjusted under 35 U.S.C. 154(b) by 161 days.

(21) Appl. No.: 11/709,939

(22) Filed: Feb. 22, 2007

(65) Prior Publication Data

US 2007/0222503 A1 Sep. 27, 2007

(30) Foreign Application Priority Data

Feb. 27, 2006 (JP) ............................. 2006-050679

(51) Int. Cl.
*H04L 27/22* (2006.01)
*H04B 1/30* (2006.01)
*H04B 1/59* (2006.01)
*H03D 1/00* (2006.01)

(52) U.S. Cl. .................. 329/304; 329/308; 375/329; 455/41.2

(58) Field of Classification Search .......... 329/304, 329/306, 308; 375/329; 455/41.2, 86; 342/42
See application file for complete search history.

(56) References Cited

U.S. PATENT DOCUMENTS 6,122,329 A * 9/2000 Zai et al. ..................... 375/329
6,501,807 B1 12/2002 Chieu et al.

* cited by examiner

*Primary Examiner*—Daniel D Chang
(74) *Attorney, Agent, or Firm*—Harness, Dickey & Pierce, P.L.C.

(57) ABSTRACT

In a receiving section, a first mixer and a second mixer generate an I signal and a Q signal from a modulated reception signal, a local signal, and a local signal obtained by shifting a phase by 90 degrees. These I signal and Q signal are supplied to a digital signal processing section via a low path filter, a capacitor, a variable gain amplifier, and an ADC. In addition, the generated I signal and Q signal are directly supplied to the digital signal processing section. The digital signal processing section detects a sign of the I signal and a sign of the Q signal, the signals being directly input. In addition, the detected sign of the I signal is multiplied with the I signal input from the ADC, and then, the detected sign of the Q signal is multiplied with the Q signal input from the ADC, whereby the signs are commonly established in a positive state. Then, the I signal and the Q signal are added, and decoded into two-values.

7 Claims, 5 Drawing Sheets

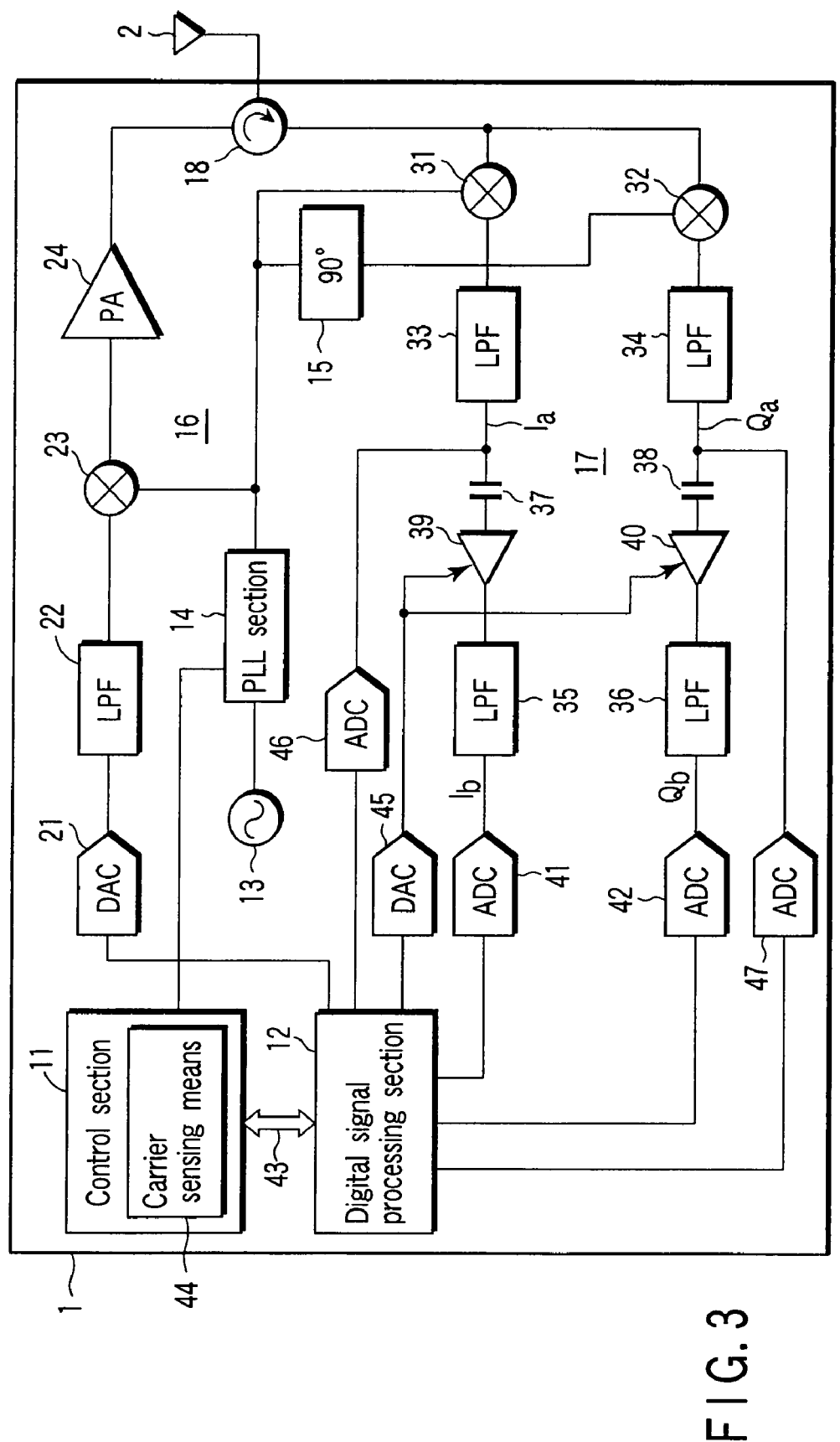
F I G. 3

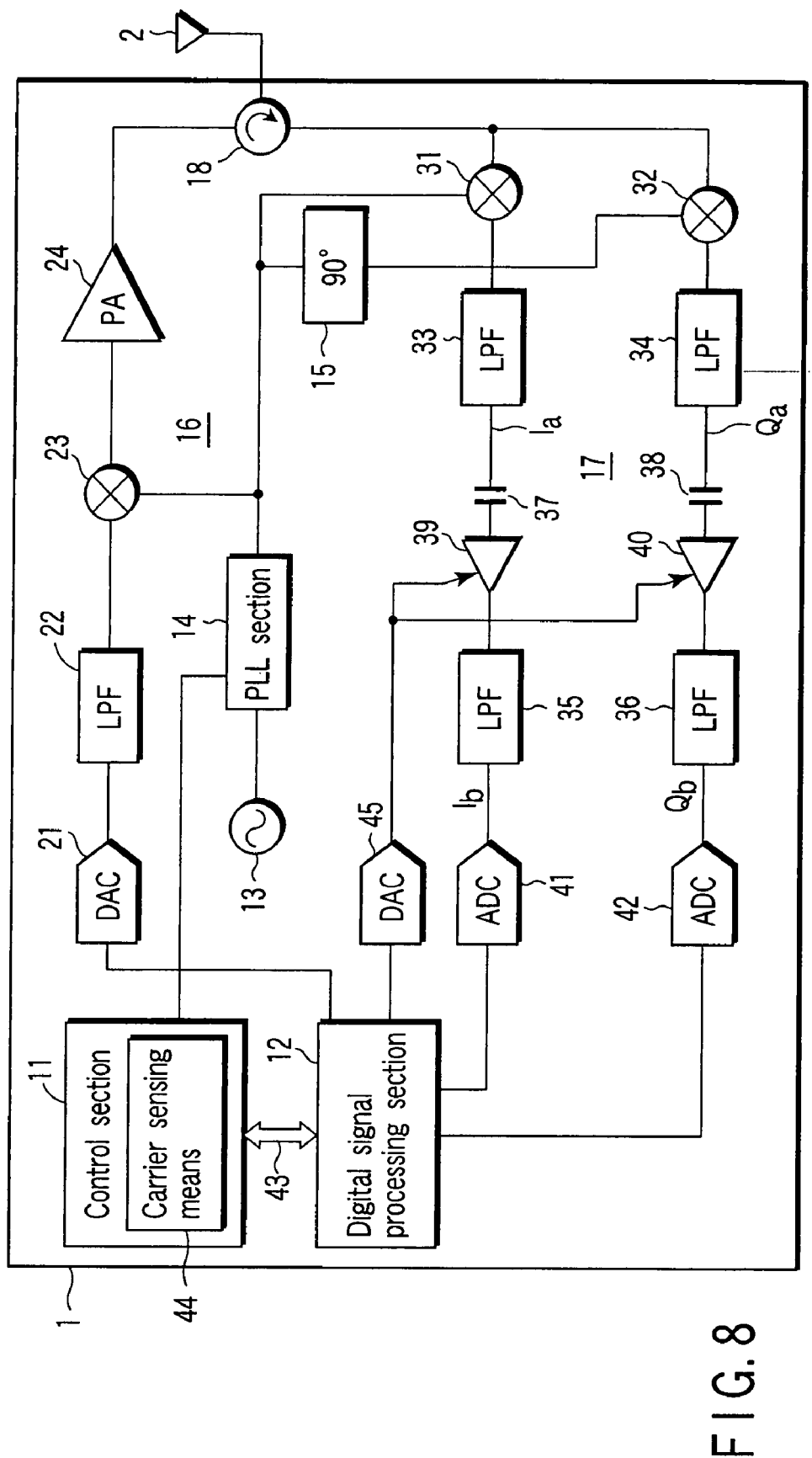
F I G. 8

QUADRATURE DEMODULATOR AND INTERROGATOR

CROSS-REFERENCE TO RELATED APPLICATIONS

This application is based upon and claims the benefit of priority from the prior Japanese Patent Application No. 2006-050679, filed Feb. 27, 2006, the entire contents of which are incorporated herein by reference.

BACKGROUND OF THE INVENTION

1. Field of the Invention

The present invention relates to a quadrature demodulator and an interrogator equipped with the quadrature demodulator for, when a reception signal is demodulated, creating an I signal and a Q signal of a baseband.

2. Description of the Related Art

An interrogator is a radio communication device that makes radio communication with a transponder called a radio tag or RFID (radio frequency identification) tag. The interrogator transmits data to the RFID tag by using a modulated radio signal, and then, continuously transmits a non-modulated signal after the end of transmitting the data. In contrast, the RFID tag carries out backscatter modulation that changes a reflection amount of the non-modulated signal from the interrogator to transmit data to the interrogator. The interrogator receives a backscatter modulation wave, and then, reads data on the RFID tag.

The interrogator is equipped with a transmitting section and a receiving section. At the transmitter side, data is subjected to modulation by a modulator, amplified by an amplifier, and then transmitted from an antenna. At the receiver side, from a high frequency signal which is the signal received by an antenna, a baseband signal is extracted by a direct conversion quadrature demodulator, and then demodulated to derive data.

The direct conversion quadrature demodulator inputs to a mixer a local signal and a reception signal having a frequency that is equal to that of a carrier of the reception signal to create an I (in-phase) signal of a baseband, and then, inputs to the mixer a signal shifted in phase by 90 degrees with respect to the local signal and the reception signal to create a Q (quadrature-phase) signal of a baseband.

Amplitudes of the I signal and Q signal are determined depending on a phase difference between the reception signal and the local signal. When the amplitude of the I signal becomes maximal, the amplitude of the Q signal becomes minimal, and when the amplitude of the I signal becomes minimal, the amplitude of the Q signal becomes maximal. When the amplitude of the Q signal is 0 that is minimal, the amplitude of the I signal is maximal. Thus, reception data can be reproduced using this I signal. Conversely, when the amplitude of the I signal is 0 that is minimal, the amplitude of the Q signal is maximal. Thus, reception data can be reproduced using this Q signal. In addition, the phases of the I signal and the Q signal may be inverted depending on a phase difference between the reception signal and the local signal.

As a method for reproducing reception data by using the direct conversion quadrature demodulator described above, there is known a method for comparing the amplitudes of the I signal and the Q signal with each other, selecting one of the signals that has a greater amplitude, and then, reproducing reception data (reference should be made to U.S. Pat. No. 6,501,807 B1, for example).

The reproducing method described in U.S. Pat. No. 6,501,807 B1 compares the amplitudes of the I signal and the Q signal with each other, selects one of the signals that has a greater amplitude, and reproduces reception data. Thus, when the amplitudes of the I signal and the Q signal are greatly different from each other, the amplitude of the selected signal is also great, and therefore, no problem occurs with reproduction. However, in the case where the amplitudes of the I signal and the Q signal are substantially equal to each other, reception data must be reproduced at an amplitude that is half of that of the reception signal, although either of the amplitudes may be selected. Thus, there has been a problem that when a level of the reception signal is low, the reception signal is easily influenced by noises, and then, incorrect reproduction of the reception data due to noises frequently occurs.

Therefore, the present invention is directed to the provision of a quadrature demodulator and an interrogator equipped with the quadrature demodulator, which can reliably suppress the influence of noises even if the level of the reception signal becomes low, thereby reducing an occurrence of incorrect reproduction of the reception data due to noises.

BRIEF SUMMARY OF THE INVENTION

The present invention resides in a quadrature demodulator which generates an I signal by multiplying a binary modulated reception signal and a local signal with each other, generates a Q signal by multiplying the reception signal and a local signal shifted in phase by 90 degrees, and generates binary data from the I signal and Q signal, the demodulator comprising: I signal sign detecting means for detecting a sign of the generated I signal; Q signal sign detecting means for detecting a sign of the generated Q signal; I signal multiplying means for multiplying the generated I signal by the sign of the I signal that appears at a non-modulated time; Q signal multiplying means for multiplying the generated Q signal by the sign of the Q signal that appears at a non-modulated time; signal adding means for adding an output of the I signal multiplying means and an output of the Q signal multiplying means; and data generating means for generating binary data from a signal output from the signal adding means.

According to the present invention, there is provided a quadrature demodulator and an interrogator equipped with the quadrature demodulator, which can reliably suppress the influence of noises even if the level of the reception signal becomes low, thereby reducing an occurrence of incorrect reproduction of the reception data due to noises.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a block diagram depicting the configuration of the interrogator shown in FIG. 1;

FIG. 8 is a block diagram depicting the configuration of an interrogator according to a second embodiment of the present invention.

DETAILED DESCRIPTION OF THE INVENTION

Now, a first embodiment of the present invention will be described with reference to the accompanying drawings.

First Embodiment

Figure 1:
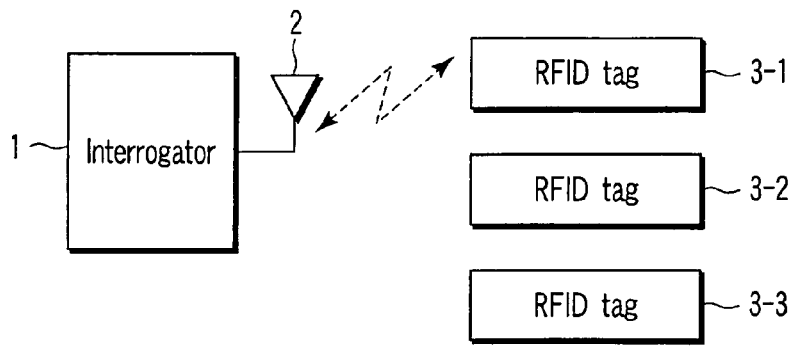
FIG. 1 is a block diagram depicting the schematic configuration of a system according to a first embodiment of the present invention.

FIG. 1 is a block diagram depicting the schematic configuration of a system including an interrogator and RFID tags that serve as transponders. The interrogator 1 is equipped with an antenna 2. The antenna 2 operates to radiate a high frequency signal as a radio wave at the time of transmission and convert a received radio wave to a high frequency signal at the time of reception.

The radio wave radiated from the antenna 2 arrives at RFID tags 3-1, 3-2, and 3-3, and the respective RFID tags receive them. The RFID tags 3-1, 3-2, and 3-3 hold identification numbers specific thereto, respectively.

When the interrogator 1 transmits a signal for interrogation, the RFID tags 3-1, 3-2, and 3-3 perform an operation corresponding to the signal for interrogation. For example, in the case where the signal for interrogation includes data that only designates the identification number for the RFID tag 3-1, a reply is returned only from the RFID tag 3-1, and thus no reply is returned from the RFID tags 3-2 and 3-3.

When the interrogator 1 transmits a signal for interrogation to the RFID tag, the antenna 2 radiates a high frequency signal modulated by means of the transmission signal. When signal transmission terminates, the interrogator continuously transmits a non-modulated high frequency signal of only a carrier. Upon receipt of the high frequency signal modulated by the interrogator 1, the RFID tag 3-1 modulates the carrier in accordance with a reply signal. In other words, backscatter modulation is carried out to send back the reply signal to the interrogator 1 as a change in the amount of the received carrier to be reflected.

While transmitting the non-modulated carrier, the interrogator 1 receives the signal which is backscatter-modulated, to obtain data from the RFID tag 3-1. As described above, exchange of data is established in the system including the interrogator and the RFID tag.

Figure 2:
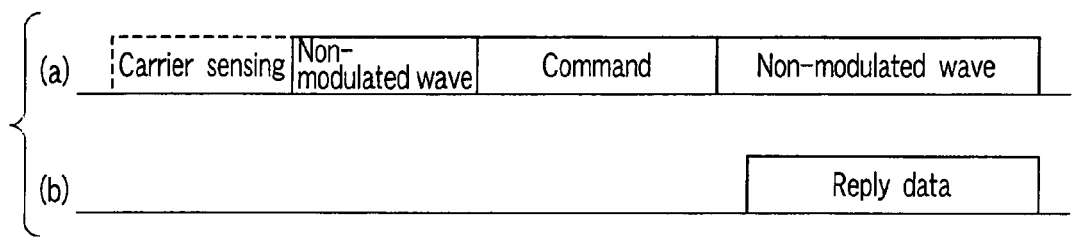
FIG. 2 is a view showing a communication format of an interrogator and an RFID tag shown in FIG. 1.

FIG. 2 is a view showing a communication format of the interrogator 1 and the RFID tags 3-1, 3-2, and 3-3, wherein (a) shows a format of a signal to be transmitted from the interrogator 1, and (b) shows a format of a signal to be transmitted from the RFID tag.

The interrogator 1 first carries out carrier sensing in order to check whether a radio wave is radiated from adjacent interrogators. This process is intended to avoid interference. When it is verified that no radio wave is radiated from the adjacent interrogators, the interrogator 1 transmits a non-modulated wave. When the non-modulated wave is transmitted from the interrogator 1, the RFID tags 3-1, 3-2, and 3-3 start up using the received non-modulated wave as a power source.

The interrogator 1 transmits a command to any one of the RFID tags 3-1, 3-2, and 3-3, following the non-modulated wave. When command transmission terminates, this interrogator continuously transmits a non-modulated wave again. The RFID tag specified by the command carries out backscatter modulation to the non-modulated wave to transmit data to the interrogator 1 as a reply to the received command. Upon completion of receiving the reply data from the RFID tag, the interrogator 1 stops transmission of the non-modulated wave. When no radio wave is transmitted from the interrogator 1, the RFID tag is made non-operative.

The interrogator 1 is configured as shown in FIG. 3. In other words, the interrogator 1 includes: a control section 11; a digital signal processing section 12; an oscillator 13 for generating a reference clock; a PLL (phase locked loop) section 14 for inputting the reference clock from this oscillator 13, and outputting a local frequency in response to a value set from the control section 11; a 90-degree phase shifter 15 for shifting by 90 degrees a phase of a local signal from this PLL section 14; a transmitting section 16; a receiving section 17; and a circulator 18. An output terminal of the transmitting section 16 and an input terminal of the receiving section 17 are connected to the circulator 18. The circulator 18 is connected to the antenna 2.

The transmitting section 16 is composed of: a first DAC (digital-to-analog converter) 21; a first LPF (low path filter) 22; a first mixer 23; and a power amplifier 24.

The receiving section 17 is composed of: second and third mixers 31 and 32; second, third, fourth, and fifth LPFs (low path filters) 33, 34, 35, and 36; first and second capacitors 37 and 38; first and second variable gain amplifiers 39 and 40 serving as variable gain amplifier means; first and second ADCs (digital-to-analog converters) 41 and 42; a second DAC 45; and third and fourth ADCs 46 and 47.

The second mixer 31 generates an I signal by multiplying a binary reception signal input via the circulator 18 and a local signal from the PLL section 14 with each other. The third mixer 32 generates a Q signal by multiplying a binary reception signal input via the circulator 18 and a 90-degree phase-shifted local signal from the 90-degree phase shifter 15 with each other.

The receiving section 17 and the digital signal processing section 12 configure a quadrature demodulator. The first capacitor 37 and the first variable gain amplifier 39 configure first means for eliminating a direct current component from the generated I signal, and then, amplifying the eliminated direct current component. The second capacitor 38 and second variable gain amplifier 40 configure second means for eliminating a direct current component from the generated Q signal, and then, amplifying the eliminated direct current component.

The control section 11 includes a CPU (central processing unit) and a memory so as to operate in accordance with a program stored in advance. The control section 11 is connected to the digital signal processing section 12 via a bus line 43, outputs transmission data to the digital signal processing section 12, and captures reception data output from the digital signal processing section 12, thereby carrying out exchange of data with an RFID tag.

In addition, the control section 11 controls the PLL section 14 to output a local frequency that is equal to a carrier frequency. Further, the control section 11 has a function of making wired communication with a host device such as a personal computer, although not shown.

The digital signal processing section 12 encodes transmission data that serves as serial data output from the control section 11; converts the encoded data to parallel data; creates data that is limited in bandwidth by a digital filter such as a FIR (finite impulse response) filter; and then, outputs the created data to the first DAC 21.

Figure 4:
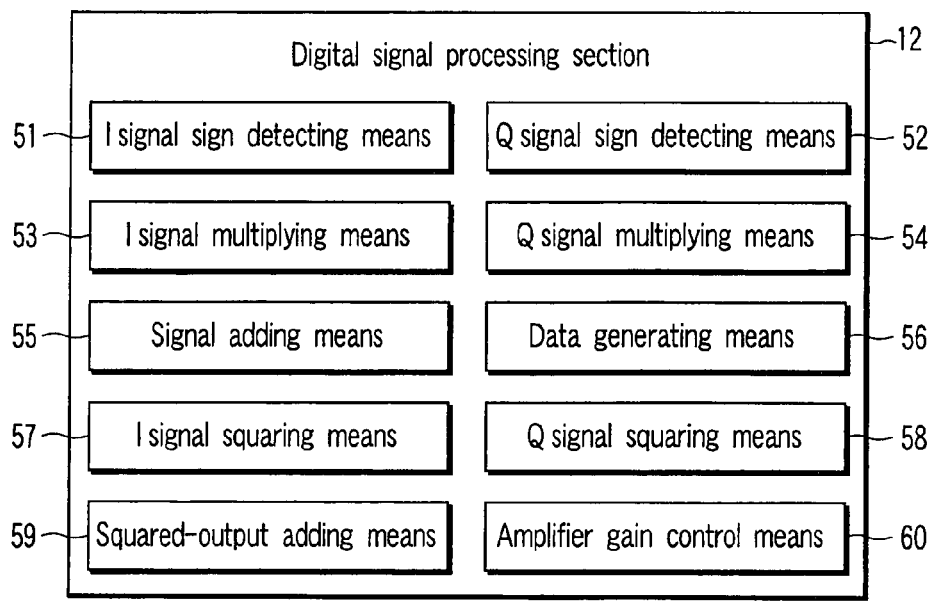
FIG. 4 is a block diagram depicting the configuration of essential portions of a digital signal processing section of the interrogator shown in FIG. 1.

In addition, the digital signal processing section 12, as shown in FIG. 4, includes: I signal sign detecting means 51 for detecting a sign of an I signal generated by the second mixer 31, the I signal being output from the second LPF 33 and digitized by the third ADC 46; and Q signal sign detecting means 52 for detecting a sign of a Q signal generated by the third mixer 32, the Q signal being output from the third LPF 34 and digitized by the fourth ADC 47. In addition, this processing section includes: I signal multiplying means 53 for multiplying digital data of an I signal input from the first ADC 41 and a sign of that I signal with each other; Q signal multiplying means 54 for multiplying digital data of a Q signal input from the second ADC 42 and a sign of that Q signal with each other; signal adding means 55 for adding an output of the I signal multiplying means 53 and an output of the Q signal multiplying means 54; and data generating means 56 for generating binary data from a signal output from the signal adding means 55. Then, the binary data decoded by the data generating means 56 is output to the control section 11 as a serial receiving data.

The I signal sign detecting means 51 compares a voltage that appears at a non-modulated time in an I signal during signal receiving and an offset voltage that appears in the I signal while stopping signal receiving with each other. When the voltage in signal receiving is higher than the offset voltage, this detecting means detects a positive sign, and when the voltage during signal receiving is equal to or lower than the offset voltage, this detecting means detects a negative sign. The Q signal sign detecting means 52 compares a voltage that appears at a non-modulated time in a Q signal during signal receiving and an offset voltage that appears at the Q signal while stopping signal receiving with each other. When the voltage in signal receiving is higher than the offset voltage, this detecting means detects a positive sign, and when the voltage during signal receiving is equal to or lower than the offset voltage, this detecting means detects a negative sign.

In addition, the digital signal processing section 12 includes: I signal squaring means 57 for squaring an output of the I signal multiplying means 53; Q signal squaring means 58 for squaring an output of the Q signal multiplying means 54; and squared-output adding means 59 for adding an output of the I signal squaring means 57 and an output of the Q signal squaring means 58, and supplies the output of the squared-output adding means 59 to the control section 11.

The control section 11 provides carrier sensing means 44. This carrier sensing means 44 acquires an RSSI (received signal strength indicator) value serving as a received-signal electric field strength of a signal received from the output of the squared-output adding means 59 so as to carry out carrier sensing for detecting ambient radio wave conditions by means of this RSSI value.

In addition, the digital signal processing section 12 includes amplifier gain control means 60 for controlling an output voltage of the second DAC 45 for controlling a gain of the first variable gain amplifier 39 and a gain of the second variable gain amplifier 40 in accordance with an amplitude of a signal output from the signal adding means 55.

At the time of transmission, the interrogator 1 outputs parallel transmission data from the digital signal processing section 12 to the DAC 21. The DAC 21 converts the input transmission data into an analog baseband signal, and then, outputs the converted signal to the first LPF 22. The first LPF 22 outputs to the first mixer 23 a signal obtained by eliminating a sampling frequency component used by the DAC 21 from the input signal.

The first mixer 23 modulates a signal from the first LPF 22 and a local signal from the PLL section 14 with each other by multiplying them, and then, outputs the modulated signal to the power amplifier 24. The power amplifier 24 electrically amplifies the modulated signal, and then, outputs the amplified signal to the circulator 18. The circulator 18 outputs the modulated signal to the antenna 2, and then, the antenna 2 spatially radiates the modulated signal as a radio wave.

Now, signal receiving of the interrogator 1 will be described here.

Figure 5:
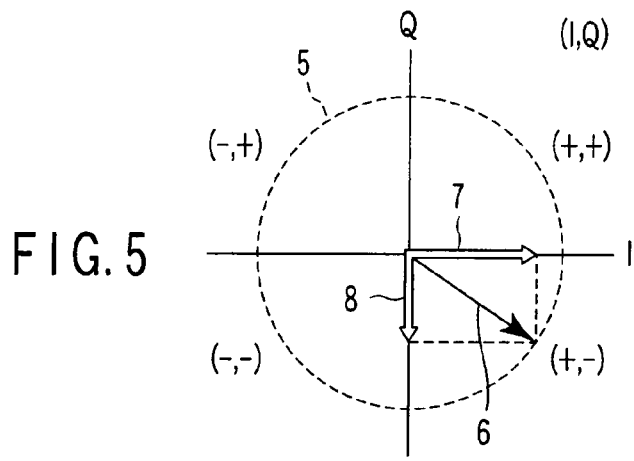
FIG. 5 is a view showing amplitude and phase relationships between I and Q signals obtained from a receiving section shown in FIG. 3.

FIG. 5 is a view showing amplitude and phase relationships of signals that appear as an I signal and a Q signal at the receiving section 17. The horizontal axis indicates an amplitude of the I signal and the vertical axis indicates an amplitude of the Q signal. An amplitude of a reception signal is indicated as a radius of a circle shown by the dotted line 5. In the case where the amplitude and phase of the reception signal are indicated by the arrow 6, the amplitude of the I signal is obtained as a positive sign in magnitude of the arrow 7. In addition, the amplitude of the Q signal is obtained as a negative sign in magnitude of the arrow 8. Depending on a phase difference between the reception signal and a local signal, there are four cases regarding the signs of the I signal and the Q signal: a case in which the signs of the I signal and Q signal both are obtained as positive signs; a case in which the sign of I signal is obtained as a negative sign and the sign of the Q signal is obtained as a positive sign; a case in which the signs of the I signal and the Q signal both are obtained as negative signs; and a case in which the sign of the I signal is obtained as a positive sign and the sign of the Q signal is obtained as a negative sign.

Figure 6:
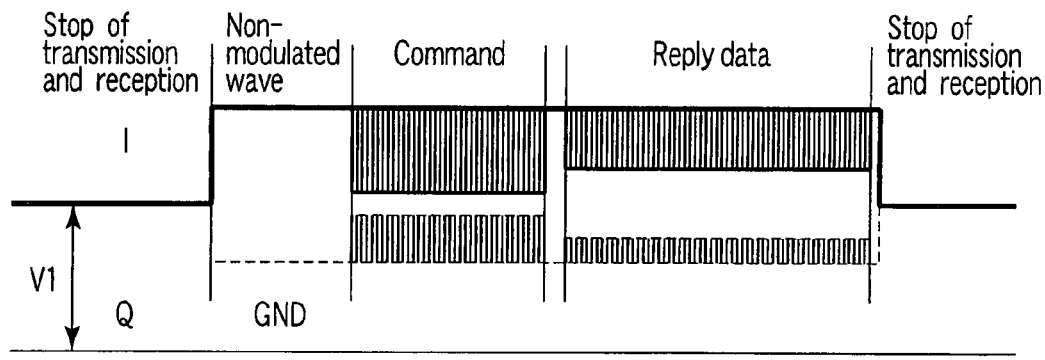
FIG. 6 is a view showing a voltage relationship between the I and Q signals obtained from the receiving section shown in FIG. 3.

FIG. 6 shows a voltage example of the I signal and the Q signal in a state in which the interrogator 1 stops transmission; first transmits a non-modulated wave; then, transmits a command; and lastly, receives reply data, and then, stops transmission. FIG. 6 is a view when a phase difference of the reception signal and the local signal is in a relationship indicated by the arrow 6 in FIG. 5. A voltage of the I signal is indicated by the solid line and a voltage of the Q signal is indicated by the dotted line.

The I signal and the Q signal are maintained at an offset voltage V1 at the time of stop of transmission and reception. When a non-modulated wave is transmitted, the voltages of the I signal and the Q signal change, but indicate a constant voltage value. In addition, when a command is transmitted, the I signal and the Q signal vary in accordance with an encoded modulated signal. For example, when reply data is received, the I signal and the Q signal vary in accordance with a reception signal. Then, when transmission and reception is stopped again, the I signal and the Q signal are maintained at the offset value V1 again.

Figure 7:
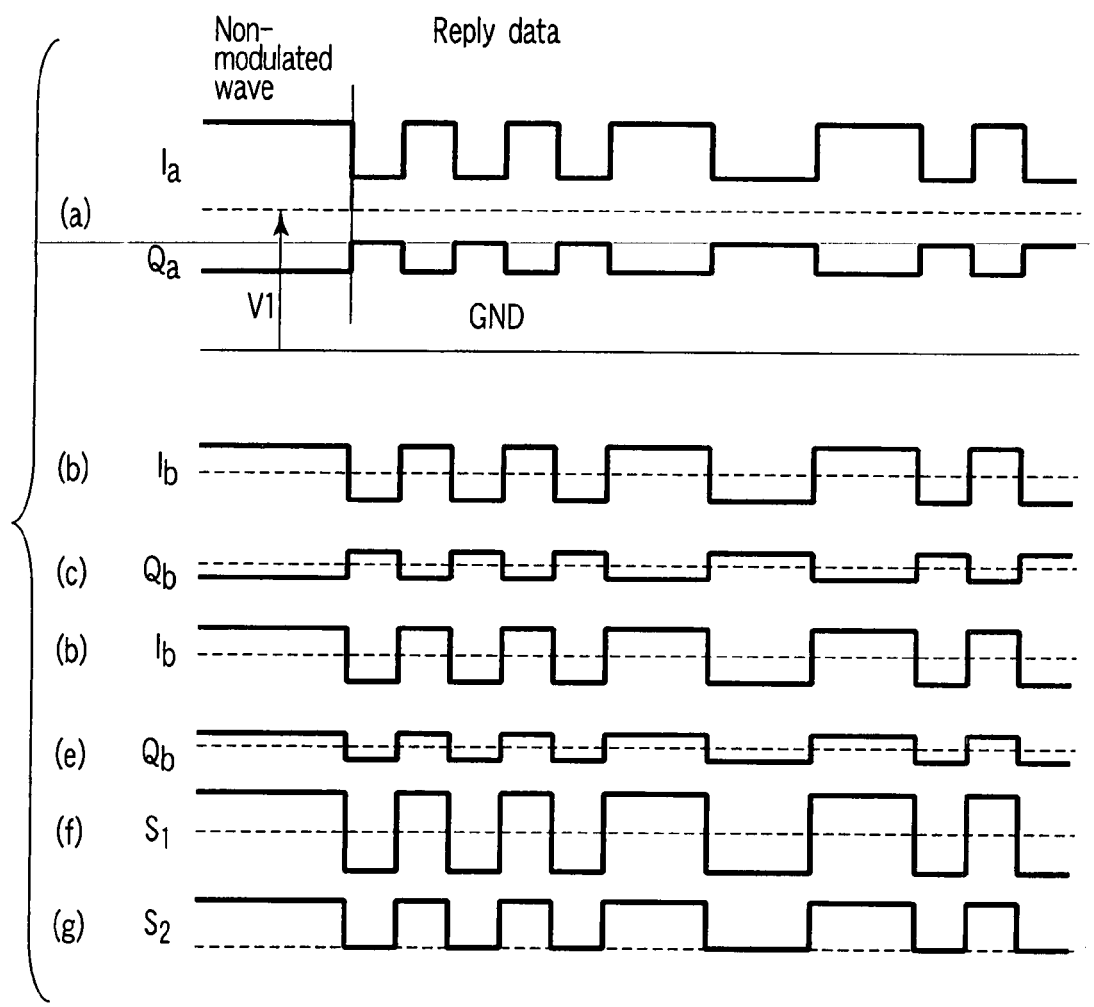
FIG. 7 is a waveform chart of output signals from components for illustrating a demodulation processing performed by a quadrature demodulator of the interrogator shown in FIG. 3.

FIG. 7 shows a signal that appears at each portion of the receiving section when reply data is received. At the time of signal receiving, a signal backscatter-modulated by the RFID tag is received by the antenna 2. This reception signal is input to each one of the second and third mixers 31 and 32 through the circulator 18.

The second mixer 31 outputs an I signal by multiplying the backscatter-modulated reception signal and a local signal from the PLL section 14 with each other. This I signal is input to the second LPF 33; a high frequency component is eliminated by this LPF 33; and a baseband signal Ia is output. In addition, the second mixer 32 outputs a Q signal by multiplying a backscatter-modulated reception signal and a local signal shifted in phase by 90 degrees by the 90-degree phase shifter 15 with each other. This Q signal is input to the third LPF 34; a high frequency component is eliminated by this LPF 34; and a baseband signal Qa is output. When a relationship in phase difference between the reception signal and the local signal is indicated by the arrow 6 of FIG. 5, a signal Ia shown in FIG. 7(*a*) is output from the second LPF 33 and a signal Qa shown in FIG. 7(*a*) is output from the third LPF 34. The voltage V1 indicates an offset voltage.

The signal output from the second LPF 33 is branched into two sections so as to be input to the third ADC 46 and the capacitor 37. In addition, the signal output from the third LPF 34 is branched into two sections so as to be input to the fourth ADC 47 and the capacitor 38. The I signal sign detecting means 51 and the Q signal sign detecting means 52 of the digital signal processing section 12 judges whether each one of the signal Ia and the signal Qa is greater or smaller than the offset voltage V1. In the case where the signal is greater than the offset voltage V1, a positive sign is detected; and in the case where the signal is equal to or smaller than the offset voltage V1, a negative sign is detected, thereby determining signs of the I signal and the Q signal.

The signal input to the capacitor 37, a direct current component of which is eliminated, is amplified by the first variable gain amplifier 39, and then, the amplified signal is input to the fourth LPF 35. The fourth LPF 35 operates as an anti-aliasing filter for eliminating a frequency component of a sampling frequency of the first ADC 41. A signal Ib shown in FIG. 7(*b*) is output from the fourth LPF 35. This signal Ib is sampled and digitally signalized by the first ADC 41, and then, the digitized signal is input to the digital signal processing section 12.

The signal input to the capacitor 38, a direct current component of which is eliminated, is amplified by the second variable gain amplifier 40, and then, the amplified signal is input to the fifth LPF 36. The fifth LPF 36 operates as an anti-aliasing filter for eliminating a frequency component of a sampling frequency of the second ADC 42. A signal Qb shown in FIG. 7(*c*) is output from the fifth LPF 36. This signal Qb is sampled and digitally signalized by the second ADC 42, and then, the digitized signal is input to the digital signal processing section 12.

The digital signal processing section 12 multiplies a sign of the signal Ib captured from the first ADC 41 and a sign of the I signal detected by the I signal sign detecting means 51 with each other by the I signal multiplying means 53. This process is intended to establish the signs in a positive state because, in the case where the sign is negative, a level is subtracted when the resulting signal is added to the Q signal later. Therefore, if the sign of the I signal is negative, the signal Ib is inverted by means of this multiplying. As shown in FIG. 7(*a*), since the sign of the I signal is positive, the signal Ib is not inverted by means of this multiplying, and a signal Ic identical to the signal Ib can be obtained as shown in FIG. 7(*d*).

In addition, the Q signal multiplying means 54 multiplies signs of the signal Qb captured from the second ADC 42 and the Q signal detected by the Q signal sign detecting means 52 with each other. This is intended to establish the signs in a positive state because, in the case where a sign is negative, a level is subtracted when the resulting signal is added to the I signal later. Therefore, if the sign of the Q signal is negative, the signal Qb is inverted by means of this multiplying. In FIG. 7(*a*), the sign of the Q signal is negative, and thus, the signal Qb is inverted by means of this multiplying, and a signal Qc shown in FIG. 7(*e*) is obtained.

The digital signal processing section 12 then adds the signal Ic and the signal Qc by the signal adding means 55. As a result, a signal S1 shown in FIG. 7(*f*) is obtained such that the respective positive and negative levels are added respectively. Further, the data generating means 56 obtains a signal S2 shown in FIG. 7(*g*) while the signal S1 is binary as 1 and 0. Thus, the data generating means 56 generates binary data.

By means of a series of such processes, a quadrature demodulator consisting of the receiving section 17 and the digital signal processing section 12 can reproduce binary data from the backscatter-modulated reception signal. Then, this quadrature demodulator adds the I signal and the Q signal so that their respective positive and negative levels increase instead of selecting either of the I signal and the Q signal, and then, demodulates the reception data. Thus, even if the level of the reception signal is lowered, the influence due to noises can be reduced to its required minimum, and then, the reception data can be reliably demodulated. In other words, occurrence of incorrect reproduction of the reception data due to noises can be reduced.

In addition, in the case where a signal S1 with a small amplitude is obtained by means of adding operation of the signal adding means 55, the digital signal processing section 12 increases a gain of each of the variable gain amplifiers 39 and 40 by means of an output voltage of the second DAC 45 controlled by the amplifier gain control means 60. In addition, in the case where the amplitude of the signal S1 is great and saturated, the gain of each of the variable gain amplifiers 39 and 40 is reduced by means of the output voltage of the second DAC 45 controlled by the amplifier gain control means 60. By doing this, the reception signal can be properly reproduced.

Further, the interrogator 1 carries out carrier sensing in order to check whether or not an adjacent interrogator makes communication prior to communication with the RFID tag. In the carrier sensing, the digital signal processing section 12 squares an output of the I signal multiplying means 53 by the I signal squaring means 57, and squares an output of the Q signal multiplying means 54 by the Q signal squaring means 58. Then, this processing section adds the output of the I signal squaring means 57 and the output of the Q signal squaring means 58 by the squared-output adding means 59. This process of squaring and adding is intended to eliminate fluctuation of the amplitude due to a phase difference between a local signal and a reception signal. A value obtained by adding the value obtained by squaring the arrow 7 of FIG. 5 and the value obtained by squaring the arrow 8 is equal to the value obtained by squaring the arrow 6. The squared added value is always equal to a value obtained by squaring the radius indicated by the dotted line 5, and is constant regardless of the phases of the I signal and the Q signal.

In this manner, an RSSI (received signal strength indicator) value that serves as reception signal electric field strength can be acquired from the squared-output adding means 59. By utilizing this value and the gains of the variable gain amplifiers 39 and 40, precise received electric power can be acquired, and proper carrier sensing can be carried out.

In the present embodiment, a low noise amplifier may be interposed between the circulator 18 and each of the second and third mixers 31 and 32.

In addition, while the present embodiment has described that the second and third LPFs 33 and 34 for eliminating a high frequency signal are individually connected to the fourth and fifth LPFs 35 and 36 that operate as anti-aliasing filters, the present invention is not limited thereto. The second and third LPFs 33 and 34 are caused to function as anti-aliasing filters, thereby making it possible to eliminate the fourth and fifth LPFs 35 and 36.

Further, while the present embodiment has described that the capacitors 37 and 38 are provided in front of the variable gain amplifiers 39 and 40 so as to carry out amplification after the direct current components of the I signal and the Q signal have been eliminated, the present invention is not limited thereto. When the direct current component is amplified in the variable gain amplifiers 39 and 40, if the amplified signal is not saturated, there is no need for eliminating the direct current component. Thus, in such a case, the capacitors 37 and 38 may not be used.

Second Embodiment

While the foregoing first embodiment has described a mode of determining a sign of a signal while comparing an I signal and a Q signal with an offset voltage, the present embodiment describes determining a sign of a signal from data on an I signal and a Q signal, and then, reproducing reception data. Like components operating in the same manner as those of the first embodiment are designated by like reference numerals, and a detailed description thereof is omitted here.

FIG. 8 is a schematic block diagram depicting the configuration of an interrogator 1. This block diagram is different from that of the first embodiment in that signals Ia and Qa output from second and third LPFs 33 and 34 of a receiving section 17 are not input to a digital signal processing section via DACs 46 and 47.

A signal Ib from a fourth LPF 35 is converted into a digital signal by a first ADC 41, and then, the converted digital signal is supplied to a digital signal processing section 121. In addition, a signal Qb from a fifth LPF 36 is converted into a digital signal by a second ADC 42, and then, the converted digital signal is supplied to the digital signal processing section 121.

Figure 9:
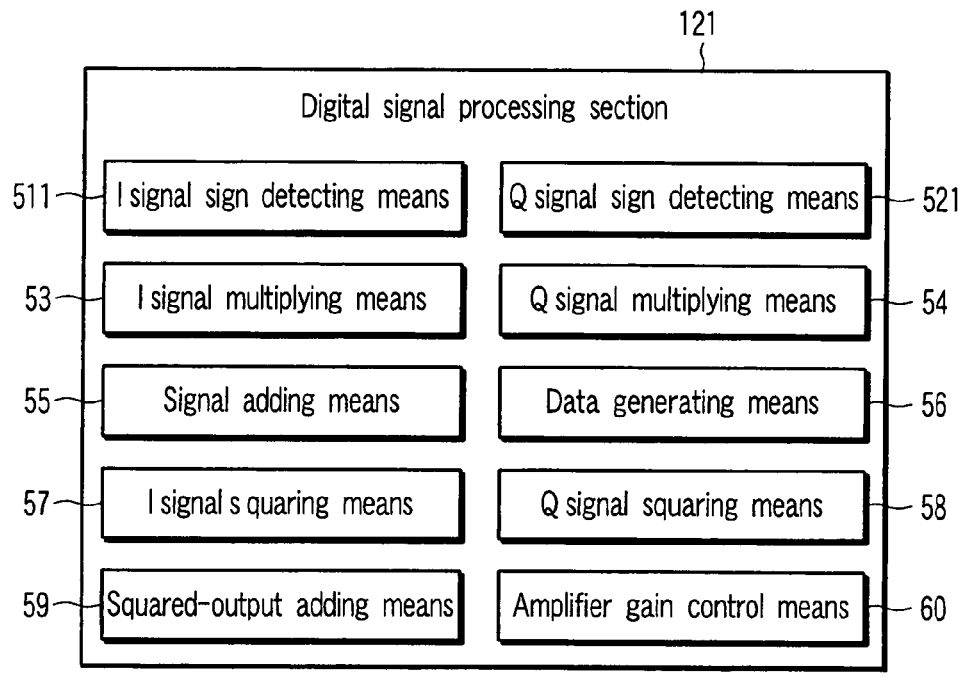
FIG. 9 is a block diagram depicting the configuration of essential portions of a digital signal processing section of the interrogator shown in FIG. 8.

The digital signal processing section 121, as shown in FIG. 9, includes I signal sign detecting means 511 and Q signal sign detecting means 521. The other components are similar to those of the foregoing first embodiment.

The I signal sign detecting means 511, unlike the I signal sign detecting means 51 of the first embodiment, predetermines whether a signal level appearing in an I signal at a predetermined position after starting signal receiving is at a high or low level; and compares this signal level with an actual signal level appearing in the I signal at a predetermined position after starting receiving. If the signal levels are identical to each other, this detecting means detects a positive sign. If the signal levels are different from each other, this detecting means detects a negative sign. The Q signal sign detecting means 521, unlike the Q signal sign detecting means 52 of the first embodiment, predetermines whether a signal level appearing in a Q signal at a predetermined position after starting signal receiving is at a high or low level; and compares this signal level with an actual signal level appearing in the Q signal at a predetermined position after starting receiving. If the signal levels are identical to each other, this detecting means detects a positive sign. If the signal levels are different from each other, this detecting means detects a negative sign.

For example, a backscatter modulation signal at the beginning of reply data is predetermined so as to be always at an "L" level between the interrogator 1 and each of the RFID tags 3-1 to 3-3. In this manner, the I signal sign detecting means 511 can detect a sign of a signal Ib to be input. In addition, the Q signal sign detecting means 521 can detect a sign of a signal Qb to be input. That is, when the signal at the beginning of received reply data is the signal Ib, the signal level is set at an "L" level, as shown in FIG. 7(b). At the signal Qb, when the signal level is set at an "H" level, as shown in FIG. 7(c), the sign of the signal Ib is obtained as a positive sign, and the sign of the signal Qb is obtained as a negative sign.

In this manner, the I signal sign detecting means 511 and the Q signal sign detecting means 521 detect signs by means of the processing that is different from that of the foregoing first embodiment.

The I signal multiplying means 53 obtains a signal Ic by multiplying signs of the captured signal Ib and the I signal detected by the I signal sign detecting means 511. In addition, the Q signal multiplying means 54 obtains a signal Qc by multiplying the signs of the captured signal Qb and the Q signal detected by the Q signal sign detecting means 521.

The subsequent processing is identical to that of the first embodiment. By doing this, function and advantageous effect similar to those of the first embodiment can be attained.

While the foregoing embodiments each have described that the received analog signal is converted into a digital signal by an ADC, and then, the converted digital signal is signal-processed by a digital signal processing section, the present invention is not limited thereto. Binary data may be reproduced, by means of only analog processing, from a reception signal by using an analog signal processing section instead of the digital signal processing section, and then, inputting the signals Ib and Qb from the fourth and fifth LPFs 35 and 36 to the analog signal processing section.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A quadrature demodulator which generates an I signal by multiplying a binary modulated reception signal and a local signal with each other, generates a Q signal by multiplying the reception signal and a local signal shifted in phase by 90 degrees, and generates binary data from the I signal and Q signal, the demodulator comprising:

I signal sign detecting means for detecting a sign of the generated I signal;

Q signal sign detecting means for detecting a sign of the generated Q signal;

I signal multiplying means for multiplying the generated I signal by the sign of the I signal that appears at a non-modulated time;

Q signal multiplying means for multiplying the generated Q signal by the sign of the Q signal that appears at a non-modulated time;

signal adding means for adding an output of the I signal multiplying means, and an output of the Q signal multiplying means; and data generating means for generating binary data from a signal output from the signal adding means.

2. The quadrature demodulator according to claim 1, wherein the I signal sign detecting means compares a voltage appearing in the I signal during signal receiving and an offset voltage appearing in the I signal when signal receiving is stopped, detects a positive sign when the voltage during signal receiving is higher than the offset voltage, and detects a negative sign when the voltage during signal receiving is equal to or smaller than the offset voltage, and the Q signal sign detecting means compares a voltage appearing in the Q signal during signal receiving and an offset voltage appearing in the Q signal when signal receiving is stopped, detects a positive sign when the voltage during signal receiving is higher than the offset voltage, and detects a negative sign when the voltage during signal receiving is equal to or smaller than the offset voltage.

3. The quadrature demodulator according to claim 1, wherein the I signal sign detecting means predetermines whether a signal level, appearing in the I signal at a predetermined position after starting signal receiving, is at a high or low level, compares this signal level with an actual signal level appearing in the I signal at a predetermined position after starting signal receiving, detects a positive sign if the signal levels are identical to each other, and detects a negative sign if the signal levels are different from each other, and the Q signal sign detecting means predetermines whether a signal level, appearing in the Q signal at a predetermined position after starting signal receiving, is at a high or low level, compares this signal level with an actual signal level appearing in the Q signal at a predetermined position after starting signal receiving, detects a positive sign if the signal levels are identical to each other, and detects a negative sign if the signal levels are different from each other.

4. The quadrature demodulator according to claim 1, further comprising:

first means for eliminating a direct current component from the generated I signal, and then, amplifying the I signal; and second means for eliminating a direct current component from the generated Q signal, and then, amplifying the Q signal, wherein the I signal from the first means is supplied to the I signal multiplying means and the Q signal from the second means is supplied to the Q signal multiplying means.

5. The quadrature demodulator according to claim 1, further comprising:

I signal squaring means for squaring an output of the I signal multiplying means;

Q signal squaring means for squaring an output of the Q signal multiplying means; and squared-output adding means for adding the output of the I signal squaring means and the output of the Q signal squaring means, wherein carrier sensing is carried out by the output of the squared-output adding means.

6. The quadrature demodulator according to claim 1, further comprising:

I signal variable gain amplifier means for amplifying the generated I signal;

Q signal variable gain amplifier means for amplifying the generated Q signal; and amplifier gain control means for controlling gains of the I signal variable gain amplifier means and the Q signal variable gain amplifier means in response to an amplitude of a signal output from multiplied-output adding means, wherein the I signal from the I signal variable gain amplifier means is supplied to the I signal multiplying means, and the Q signal from the Q signal variable gain amplifier means is supplied to the Q signal multiplier means.

7. An interrogator comprising:

a receiving section having the quadrature demodulator according to claim 1;

a transmitting section which transmits a modulated wave and a non-modulated wave; and an antenna commonly used for the receiving section and the transmitting section.

* * * * *